US009332779B2

(12) United States Patent
Marga (10) Patent No.: US 9,332,779 B2
(45) Date of Patent: May 10, 2016

(54) DRIED FOOD PRODUCTS FORMED FROM CULTURED MUSCLE CELLS

(71) Applicant: Modern Meadow, Inc., Brooklyn, NY (US)

(72) Inventor: Francoise Suzanne Marga, Columbia, MO (US)

(73) Assignee: Modern Meadow, Inc., Brooklyn, NY (US)

(*) Notice: Subject to any disclaimer, the term of this patent is extended or adjusted under 35 U.S.C. 154(b) by 0 days.

(21) Appl. No.: 14/615,354

(22) Filed: Feb. 5, 2015

(65) Prior Publication Data

US 2015/0216216 A1 Aug. 6, 2015

Related U.S. Application Data

(60) Provisional application No. 61/936,064, filed on Feb. 5, 2014.

(51) Int. Cl.
*A23L 1/314* (2006.01)
*A23L 1/31* (2006.01)
*A23L 1/00* (2006.01)

(52) U.S. Cl.
CPC ........... *A23L 1/31418* (2013.01); *A23L 1/0014* (2013.01); *A23L 1/31* (2013.01); *A23L 1/31445* (2013.01)

(58) Field of Classification Search
CPC .................................................. A23L 1/31418
See application file for complete search history.

(56) References Cited

U.S. PATENT DOCUMENTS

| | | |
|---|---|---|
| 3,497,363 A | 2/1970 | Fox |
| 3,512,993 A | 5/1970 | Conley et al. |
| 3,956,560 A | 5/1976 | Smith, II |
| 4,247,279 A | 1/1981 | Masters |
| 4,291,992 A | 9/1981 | Barr et al. |
| 4,465,472 A | 8/1984 | Urbaniak |
| 4,564,597 A | 1/1986 | Lerner et al. |
| 4,585,139 A | 4/1986 | Bronson et al. |
| 4,646,106 A | 2/1987 | Howkins |
| 4,665,492 A | 5/1987 | Masters |
| 4,673,304 A | 6/1987 | Liu et al. |
| 4,772,141 A | 9/1988 | Sanders, Jr. et al. |
| 4,889,438 A | 12/1989 | Forsyth et al. |
| 4,896,980 A | 1/1990 | Sanders, Jr. et al. |

(Continued)

FOREIGN PATENT DOCUMENTS

| | | |
|---|---|---|
| CA | 2306346 A1 | 1/1999 |
| EP | 1589098 A1 | 10/2005 |

(Continued)

OTHER PUBLICATIONS

Thibault et al., "Chain Association of Pectic Molecules During Calcium-Induced Gelation"—Biopolymers, vol. 25, 1986, p. 455-468.*

(Continued)

*Primary Examiner* — Elizabeth Gwartney
(74) *Attorney, Agent, or Firm* — Shay Glenn LLP (57) ABSTRACT

Dehydrated, edible, high-protein food products formed of cultured muscle cells that are combined (e.g., mixed) with a hydrogel (e.g., a plant-derived polysaccharide) are described. These food products may be formed into a chip (e.g., snack chip), that has a protein content of greater than 50%. One or more flavorants may also be included.

13 Claims, 3 Drawing Sheets

(56) References Cited

U.S. PATENT DOCUMENTS

| | | | |
|---|---|---|---|
| 4,921,365 A | 5/1990 | Sanders, Jr. et al. |
| 4,948,280 A | 8/1990 | Sanders, Jr. et al. |
| 4,969,758 A | 11/1990 | Sanders, Jr. et al. |
| 4,980,112 A | 12/1990 | Masters |
| 4,980,403 A | 12/1990 | Bateman et al. |
| 5,016,121 A | 5/1991 | Peddle et al. |
| 5,039,297 A | 8/1991 | Masters |
| 5,040,911 A | 8/1991 | Sanders, Jr. et al. |
| 5,134,569 A | 7/1992 | Masters |
| 5,171,273 A | 12/1992 | Silver et al. |
| 5,204,055 A | 4/1993 | Sachs et al. |
| 5,216,606 A | 6/1993 | Lentz et al. |
| 5,490,962 A | 2/1996 | Cima et al. |
| 5,492,937 A | 2/1996 | Bogentoft et al. |
| 5,546,313 A | 8/1996 | Masters |
| 5,599,695 A | 2/1997 | Pease et al. |
| 5,605,662 A | 2/1997 | Heller et al. |
| 5,658,802 A | 8/1997 | Hayes et al. |
| 5,697,324 A | 12/1997 | van der Lely |
| 5,702,717 A | 12/1997 | Cha et al. |
| 5,739,832 A | 4/1998 | Heinzl et al. |
| 5,797,898 A | 8/1998 | Santini, Jr. et al. |
| 5,798,779 A | 8/1998 | Nakayasu et al. |
| 5,831,070 A | 11/1998 | Pease et al. |
| 5,929,208 A | 7/1999 | Heller et al. |
| 6,087,102 A | 7/2000 | Chenchik et al. |
| 6,103,528 A | 8/2000 | An et al. |
| 6,109,717 A | 8/2000 | Kane et al. |
| 6,123,861 A | 9/2000 | Santini, Jr. et al. |
| 6,132,468 A | 10/2000 | Mansmann |
| 6,139,831 A | 10/2000 | Shivashankar et al. |
| 6,171,797 B1 | 1/2001 | Perbost |
| 6,197,575 B1 | 3/2001 | Griffith et al. |
| 6,239,273 B1 | 5/2001 | Pease et al. |
| 6,261,493 B1 | 7/2001 | Gaylo et al. |
| 6,336,480 B2 | 1/2002 | Gaylo et al. |
| 6,383,549 B1 | 5/2002 | Agostinelli |
| 6,387,707 B1 | 5/2002 | Seul et al. |
| 6,394,585 B1 | 5/2002 | Ross |
| 6,402,403 B1 | 6/2002 | Speakman |
| 6,419,883 B1 | 7/2002 | Blanchard |
| 6,451,346 B1 | 9/2002 | Shah et al. |
| 6,454,811 B1 | 9/2002 | Sherwood et al. |
| 6,455,311 B1 | 9/2002 | Vacanti |
| 6,495,102 B1 | 12/2002 | Suslick et al. |
| 6,497,510 B1 | 12/2002 | Delametter et al. |
| 6,514,518 B2 | 2/2003 | Monkhouse et al. |
| 6,527,378 B2 | 3/2003 | Rausch et al. |
| 6,536,873 B1 | 3/2003 | Lee et al. |
| 6,536,895 B2 | 3/2003 | Kashiwagi et al. |
| 6,538,089 B1 | 3/2003 | Samra et al. |
| 6,543,872 B2 | 4/2003 | Ohtsuka et al. |
| 6,547,994 B1 | 4/2003 | Monkhouse et al. |
| 6,548,263 B1 | 4/2003 | Kapur et al. |
| 6,550,904 B2 | 4/2003 | Koitabashi et al. |
| 6,561,626 B1 | 5/2003 | Min et al. |
| 6,561,642 B2 | 5/2003 | Gonzalez |
| 6,565,176 B2 | 5/2003 | Anderson et al. |
| 6,835,390 B1 | 12/2004 | Vein |
| 6,942,830 B2 | 9/2005 | Mülhaupt et al. |
| 6,979,670 B1 | 12/2005 | Lyngstadaas et al. |
| 7,051,654 B2 | 5/2006 | Boland et al. |
| 7,166,464 B2 | 1/2007 | McAllister et al. |
| 7,270,829 B2 | 9/2007 | Van Eelen |
| 7,625,198 B2 | 12/2009 | Lipson et al. |
| 8,076,137 B2 | 12/2011 | McAllister et al. |
| 8,703,216 B2 | 4/2014 | Forgacs et al. |
| 2002/0031500 A1 | 3/2002 | MacLaughlin et al. |
| 2002/0059049 A1 | 5/2002 | Bradbury et al. |
| 2002/0064808 A1 | 5/2002 | Mutz et al. |
| 2002/0064809 A1 | 5/2002 | Mutz et al. |
| 2002/0084290 A1 | 7/2002 | Materna |
| 2002/0089561 A1 | 7/2002 | Weitzel et al. |
| 2002/0090720 A1 | 7/2002 | Mutz et al. |
| 2002/0106412 A1 | 8/2002 | Rowe et al. |
| 2002/0160109 A1 | 10/2002 | Yeo et al. |
| 2002/0164319 A1 | 11/2002 | Khaw et al. |
| 2002/0173586 A1 | 11/2002 | Jeong et al. |
| 2002/0182633 A1 | 12/2002 | Chen et al. |
| 2002/0188349 A1 | 12/2002 | McAllister et al. |
| 2003/0012805 A1 | 1/2003 | Chen et al. |
| 2003/0031500 A1 | 2/2003 | Bouveresse |
| 2003/0032203 A1 | 2/2003 | Sabatini et al. |
| 2003/0059537 A1 | 3/2003 | Chilkoti et al. |
| 2003/0100824 A1 | 5/2003 | Warren et al. |
| 2003/0113433 A1 | 6/2003 | Tempesta |
| 2003/0153078 A1 | 8/2003 | Libera et al. |
| 2003/0175410 A1 | 9/2003 | Campbell et al. |
| 2003/0190438 A1 | 10/2003 | Suzuki et al. |
| 2004/0039727 A1 | 2/2004 | Dessloch et al. |
| 2004/0219133 A1 | 11/2004 | Lyles |
| 2005/0118326 A1 | 6/2005 | Anfinsen et al. |
| 2005/0163912 A1* | 7/2005 | White ........................ 426/641 |
| 2005/0276791 A1 | 12/2005 | Hansford et al. |
| 2006/0121006 A1 | 6/2006 | Chancellor et al. |
| 2007/0142916 A1 | 6/2007 | Olson et al. |
| 2007/0231787 A1 | 10/2007 | Voelker |
| 2008/0070304 A1 | 3/2008 | Forgacs et al. |
| 2008/0171994 A1 | 7/2008 | Williams et al. |
| 2009/0069893 A1 | 3/2009 | Paukshto et al. |
| 2009/0142307 A1 | 6/2009 | Athanasiou et al. |
| 2009/0208466 A1 | 8/2009 | Yoo et al. |
| 2009/0209823 A1 | 8/2009 | Yamane |
| 2009/0248145 A1 | 10/2009 | Chan et al. |
| 2010/0041134 A1 | 2/2010 | Forgacs et al. |
| 2010/0189712 A1 | 7/2010 | L'Heureux et al. |
| 2011/0165301 A1 | 7/2011 | Blumenthal |
| 2011/0212179 A1 | 9/2011 | Liu |
| 2011/0212501 A1 | 9/2011 | Yoo |
| 2012/0023777 A1 | 2/2012 | Greene |
| 2012/0116568 A1 | 5/2012 | Murphy et al. |
| 2012/0230950 A1 | 9/2012 | Niklason et al. |
| 2013/0029008 A1 | 1/2013 | Forgacs et al. |
| 2013/0255003 A1 | 10/2013 | Forgacs et al. |
| 2013/0287896 A1 | 10/2013 | Harel et al. |
| 2014/0093618 A1 | 4/2014 | Forgacs et al. |
| 2014/0205729 A1 | 7/2014 | Didzbalis et al. |
| 2015/0079238 A1 | 3/2015 | Marga et al. |

FOREIGN PATENT DOCUMENTS

| | | |
|---|---|---|
| EP | 2090584 A1 | 8/2009 |
| JP | 06017378 A | 1/1994 |
| JP | 09-047502 A | 2/1997 |
| KR | 100716015 B | 5/2007 |
| WO | WO 99/31222 A1 | 6/1999 |
| WO | WO 99/31223 A1 | 6/1999 |
| WO | WO01/68811 A2 | 9/2001 |
| WO | WO2005/081970 A2 | 9/2005 |
| WO | WO2007/124023 A2 | 11/2007 |
| WO | WO2009/070720 A1 | 6/2009 |
| WO | WO2010/008905 A2 | 1/2010 |
| WO | WO2011051983 A1 | 5/2011 |
| WO | WO2012/054195 A2 | 4/2012 |
| WO | WO2014/039938 A1 | 3/2014 |

OTHER PUBLICATIONS

Bian et al., "Engineered skeletal muscle tissue networks with controllable architecture"—Biomaterials, 30, 2009, p. 1401-1412.*

Aldhous; Print me a heart and a set of arteries; New Scientist; Apr. 23, 2006; retrieved from the internet on Jun. 3, 2015 (http://organprint.missouri.edu/www/news/NewScientistApril2006.pdf).

Hopkins et al.; A vegetarian meat: could technology save animals and satisfy meat eaters?; J. Agric. Environ. Ethics.; 21; pp. 579-596; Jul. 11, 2008; retrieved from the internet on Jun. 2, 2015 (http://foodethics.univie.ac.at/fileadmin/user_upload/inst_ethik_wiss_dialog/Hopkins_P._2008_Veg_Meat_and_In_Meat.pdf).

Matsuda et al.; Tissue engineering based on cell sheet technology; Adv. Materials; 19(20); pp. 3089-3099; Oct. 17, 2007.

Sekine et al.; Myocardial tissue reconstruction: the cell sheet engineering approach; Inflammation and Regeneration; 27(3); pp. 171-176; May 2007.

(56) References Cited

OTHER PUBLICATIONS

Yang et al.; Cell sheet engineering: recreating tissues without biodegradable scaffold; Biomaterials; 26(33); pp. 6415-6422; Nov. 2005.
Arding; Vegetarian cheese; Culture the word on cheese; 2 pgs.; Dec. 3, 2013; retrieved from the internet on Oct. 31, 2014; (http://culturecheesemag.com/ask-the-monger/vegetarian-cheese).
Barnard et al. "The medical costs attributable to meat consumption." Prev. Med. Nov. 1995, 24(6), 646-655.
Benjaminson et al. "In vitro edible muscle protein production system." (MPPS): Stage 1, fish. Acta. Astronaut. Dec. 2002, 51(12), 879-889.
Bhat et al. "Animal-free Meat Biofabrication." Am. J. Food Tech. Jun. 2011, 6(6), 441-459.
Bhat et al. "Tissue engineered meat-Future meat." Journal of Stored Products and Postharvest Research; Jan. 2011, 2(1), 1-10.
Boonen et al. "Essential environmental cues from the satellite cell niche: optimizing proliferation and differentiation." Am. J. Physiol. Cell Physiol. Jun. 2009, 296(6), C1338-C1345.
Boonen et al. "The Muscle Stem Cell Niche: Regulation of Satellite Cells During Regeneration." Tiss. Eng. Part B, Dec. 2008, 14(4), 419-431.
Datar et al. "Possibilities for an in vitro meat production system." Innovative Food Science and Emerging Technologies. Jan. 2010, 11(1), 13-22.
De Deyne, P. G. "Formation of sarcomeres in developing myotubes: role of mechanical stretch and contractile activation." Am. J. Physiol. Cell Physiol. Dec. 2000, 279(6), C1801-C1811.
Dennis et al. "Excitability and contractility of skeletal muscle engineered from primary cultures and cell lines:" Am. J. Physiol. Cell Physiol. Feb. 2001, 280(2), C288-C295.
Dennis et al. "Excitability and isometric contractile properties of mammalian skeletal muscle constructs engineered in vitro." In vitro Cell Dev. Biol. Anim. May 2000, 36(5), 327-335.
Edelman et al. Commentary: In vitro-cultured meat production. Tissue Eng. May 2005, 11(5-6), 659-662.
Edelman, E.R. "Vascular Tissue Engineering: Designer Arteries" Circ Res, Dec. 1999, 85(12):1115-1117.
Engler, A. J., et al., "Myotubes differentiate optimally on substrates with tissue-like stiffness: pathological implications for soft or stiff microenvironments," J. Cell Biol. Sep. 2004, 166(6), 877-887.
European Food Safety Authority. The Community Summary Report on Trends and Sources of Zoonoses, Zoonotic Agents. Antimicrobial Resistance and Food borne Outbreaks in the European Union in 2005. EFSA J. May 2007, 94, 2-288.
Fonseca et al. "Slow fiber cluster pattern in pig longissimus thoracic muscle: Implications for myogenesis." Journal of Animal Science, Apr. 2003, 81(4), 973-983.
Gawlitta et al. The influence of serum-free culture conditions on skeletal muscle differentiation in a tissue-engineered model. Tissue Eng. Part A, Jan. 2008 14(1), 161-171.
Jakab et al. "Engineering Biological Structures of Prescribed Shape Using Self-assembling Multicellular Systems." Proc. Natl. Acad. Sci. USA, Mar. 2004, 101(9): 2864-2869.
Katsumata, M. "Promotion of intramuscular fat accumulation in porcine muscle by nutritional regulation." Anim. Sci. J., Feb. 2011, 82(1), 17-25.
Kosnik, et al., Tissue engineering skeletal muscle: In Guilak F. Butler DL, Goldstein SA and D. Mooney (Ed) Functional tissue engineering. New York: Springer-Verlag, Aug. 2004, pp. 377-392.
Langelaan et al., "Meet the new meat: tissue engineered skeletal muscle." Trends in Food Science & Technology Feb. 2010, 21(2), 59-66.
Langer et al.; Tissue Engineering; Science; 260(5110); pp. 920-926; May 1993.

Lee et al. "Multi-layered culture of human skin fibroblasts and keratinocytes through three-dimensional freeform fabrication," Biomaterials, Mar. 2009, 30(8): 1587-1595.
Levenberg, et al. "Engineering vascularized skeletal muscle tissue." Nat. Biotech. Jul. 2005, 23(7), 879-884.
Marga et al. "Developmental Biology and Tissue Engineering," Birth Defects Res C Embryo Today; 81(4):320-328; Dec. 2007.
Marga et al. "Toward engineering functional organ modules by additive manufacturing," Biofabrication, Jun. 2012, 4(2): 022001, 12 pages.
Mead et al. Food-Related Illness and Death in the United States. Emerg. Infect. Dis. Sep. 1999, 5(5), 607-625.
Mironov et al. "Bioprinting Living Structures." J. Mat. Chem., May 2007, 17(20): 2054-2060.
Munarin et al.; Pectin-based injectable biomaterials for bone tissue engineering; Biomacromolecules; 12(3); pp. 568-577; Mar. 14, 2011 (Abstract Only).
Niklason et al. "Advances in Tissue Engineering of Blood Vessels and Other Tissues." Transpl. Immunol., Dec. 1997, 5(4): 303-306.
Norotte et al. "Scaffold-free vascular tissue engineering using bioprinting." Biomaterials, Oct. 2009, 30(30): 5910-5917 (Author Manuscript, 16 pgs.).
Park, et al. "Effects of electrical stimulation in C2C12 muscle constructs." J. Tissue Eng. Regen. Med. Jul. 2008, 2(5), 279-287 (Author Manuscript, 17 pgs.).
Perera et al.; Hydrophobic thiolation of pectin with 4-aminothiophenol: systesis and in vitro characterization; AAPS PharmSci. Tech.; 11(1); Mar. 2010.
Perez-Pomares et al. "Tissue fusion and cell sorting in embryonic development and disease: biomedical implications." Bioessays, Aug. 2006, 28(8): 809-821.
Pette, et al. "What does chronic electrical stimulation teach us about muscle plasticity?" Muscle Nerve, Jun. 1999, 22(6), 666-677.
Savadogo, et al. "Effects of grazing intensity and prescribed fire on soil physical and hydrological properties and pasture yield in the savanna woodlands of Burkina Faso." Agricult. Ecosys. Environ. Jan. 2007, 118(1-4), 80-92.
Smith et al., "Three-Dimensional BioAssembly Tool for Generating Viable Tissue-Engineered Constructs," Tissue Engineering, vol. 10, No. 9/10, pp. 1566-1576 (Sep. 2004).
Sommer et al.; Ascorbic acid modulates proliferation and extracellular matrix accumulation of hyalocytes; Tissue Eng; 13(6):1281-1289 (Abstract Only); Jun. 2007.
Thelen, et al. "Electrical stimulation of C2C12 myotubes induces contractions and represses thyroid hormone-dependent transcription of the fast-type sarcoplasmic-reticulum $Ca^{2+}$-ATPase gene." Biochem. J. Feb. 1997, 321(Pt 3), 845-848.
Tuomisto, et al. "Environmental Impacts of Cultured Meat Production." Environ. Sci. Technol. Jun. 2011, 45(14), 6117-6123.
Jakab et al.; Tissue engineering by self-assembly and bio-printing of living cells; Biofabrication; 2(2); pp. 1-14; Jun. 2, 2010.
Meyer et al.; Collagen fibres by theromoplastic and wet spinning; Materials Science and Engineering; C; 30(8); pp. 1266-1271; Oct. 2010.
Shepherd et al.; Effect of fiber crosslinking on collagen-fiber reinforced collagen-chondroitin-6-sulfate materials for regenerating load-bearing soft tissues; Journal of Biomedical Materials Research; 101A(1); pp. 176-184; Jan. 2013.
Wu et al.; Fiber formation by dehydration-induced Aggregation of Albumin; J. Appl. Polym. Sci.; 129(6); pp. 3591-3600; Sep. 15, 2013.

\* cited by examiner

Meat Chips Comp of 45
NFL ID: AG03721

| Analyte | Result | Units | Test Date | Method Ref. |
| --- | --- | --- | --- | --- |
| Calcium | 427.6 | mg/100g | 04/08/14 | CM5004 |
| Iron | 1.7 | mg/100g | 04/08/14 | CM5004 |
| Moisture | 4.01 | % | 04/01/14 | CM4012 |
| Protein | 68.5 | % | 03/31/14 | CM4006 |
| Total Fat | 8.17 | % | 04/03/14 | CM4011 |

FIG. 5

DRIED FOOD PRODUCTS FORMED FROM CULTURED MUSCLE CELLS

CROSS REFERENCE TO RELATED APPLICATIONS

This patent application claims priority to U.S. Provisional Patent Application No. 61/936,064, filed on Feb. 5, 2014 (titled "DRIED FOOD PRODUCTS FORMED FROM CULTURED MUSCLE CELLS"), which is herein incorporated by reference in its entirety.

This patent application may also be related to one or more (or all) of: U.S. patent application Ser. No. 14/486,850, filed Sep. 15, 2014 ("EDIBLE AND ANIMAL-PRODUCT-FREE MICROCARRIERS FOR ENGINEERED MEAT"); U.S. patent application Ser. No. 14/092,801, titled "ENGINEERED COMESTIBLE MEAT," filed on Nov. 27, 2013 (which is a continuation of U.S. Pat. No. 8,703,216, filed on Jul. 26, 2012), and PCT Application No. PCT/US2013/058684, titled "SPHERICAL MULTICELLULAR AGGREGATES WITH ENDOGENOUS EXTRACELLULAR MATRIX" on Sep. 9, 2013. Each of these patents and patent application are herein incorporated by reference in their entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are edible (e.g., fit for human consumption) food products formed from a dehydrated mixture of cultured cells and a carrier (such as hydrogel), as well as methods of making and using them to form engineered meat products.

BACKGROUND

The human body needs protein for growth and maintenance. Aside from water, protein is the most abundant molecule in the body. According to U.S. and Canadian Dietary Reference Intake guidelines, women aged 19-70 need to consume 46 grams of protein per day, while men aged 19-70 need to consume 56 grams of protein per day to avoid deficiency. This recommendation, however, is for a sedentary person free of disease. Protein deficiency can lead to reduced intelligence or mental retardation as well as contribute to the prevalence of diseases such as kwashiorkor. Protein deficiency is a serious problem in developing countries, particularly, in countries affected by war, famine, and overpopulation. Animal sources of protein, such as meat, are often a source of the complete complement of all the essential amino acids in adequate proportions.

The nutritional benefits of meat are tempered by potential associated environmental degradation. According to a 2006 report by the Food and Agriculture Organization of the United Nations (FAO), entitled Livestock's Long Shadow—Environmental Issues and Options, the livestock industry is one of the largest contributors to environmental degradation worldwide, and modern practices of raising animals for food contributes widely to air and water pollution, land degradation, climate change, and loss of biodiversity. The production and consumption of meat and other animal sources of protein is also associated with the clearing of rainforests and species extinction. Accordingly, there is a need for a solution to demands for alternative to meat produced from live animals.

Foods such as chips (e.g., chips, crisps, puffs, crackers, jerky, etc.) are a favorite snack foods in the United States. Commercially available chips typically contain high amounts of fat and sodium, and imply high caloric intake. Excessive consumption may lead to increased health risks, such as of hypertension. For example, potato chips contain high caloric values, typically 150-160 calories (90-99 of those from fat) per ounce. Baked potato chips, advertised as a healthier alternative to conventional, fried chips, typically contain 120 calories, 18 of those from fat in the same serving size. High caloric intakes, when combined with a passive lifestyle, can contribute to obesity, hypertension and peripheral artery disease. In addition, traditional potato chips generally contain high levels of sodium, in amounts ranging from 7% to 8% of the daily recommended value based on a 2,000 calorie diet; a surprising amount, considering an ounce generally consists of less than 15 chips. High levels of sodium reportedly contribute to the emergence of conditions such as hypertension, which can lead to an increased risk of heart attack. Fried potato chips often contain high amounts of fat and saturated fat, from 10 to 11 grams of fat, 3 of those from saturated fat (representing form 15% to 17% of the daily recommended value based on a 2,000 calorie diet) per serving. The high fat content can pose a serious health risk, as high fat intake can lead to build-up of plaque in arteries, increasing the propensity for heart attack and stroke. Similarly, consuming excess fat on a regular basis may increase the risk of diabetes and obesity.

There is a need for a snack food, particularly one that may resemble the widely popular chips, that is high in protein, fiber and calcium, and low in fat. Although so-called "meat chips" have been proposed in the past, such products have proven expensive, lacking in flavor, and, which potentially high in protein, have also been high in sodium and fat, preventing these from being a valid alternative to traditional chips. Also importantly, such "meat chips" have been fabricated from animals grown and slaughtered in the same manner as most commercially available meats. As mentioned above, this is both environmentally problematic, but may also raise moral and ethical issues for consumers.

For example, crisp meat-based snacks that resemble potato chips or other carbohydrate-based snacks are described, for example, in U.S. Pat. No. 3,497,363, which suggests a crisp fried meat snack formed by deep-fat frying a freeze-dried slice of meat. The freeze-drying is said to be critical to the crisp, chewable nature of the chip. Freeze-drying can be relatively costly on a commercial scale and deep-fat frying increases the fat content of the chips, leading to an expensive, high-fat snack. U.S. Pat. No. 3,512,993 proposes mixing meat or seafood with water and a 50/50 blend of potato and corn starch to form a dough that is cooked under pressure and sliced. The resultant slices are dried and deep-fat fried before eating. Frying lends the chips a flaky texture instead of the "hard, horny texture" of the dried chips. This product is high in fat (with fat contents of 30-40% suggested) and starch; this makes the chips less desirable to those controlling caloric and carbohydrate intake from snack foods. Others have posited approaches for drying sausage slices to make a snack food without having to fry the slices. U.S. Pat. No. 6,383,549 and U.S. Patent Application Publications 2003/0113433 and 2004/0039727, for example, suggest such processes. Most of these, however, are not well adapted to commercial-scale production of an inexpensive snack food and are limited to home-scale batches or expensive specialty products.

Described herein are dehydrated foods that may be formed as chips that address the shortcomings described above.

SUMMARY OF THE DISCLOSURE

The present invention relates to food products that may be formed of cultured cells combined (e.g., mixed) with a hydrogel (e.g., a plant-derived polysaccharide or polysaccharide-based hydrogel, such as pectin) that is dehydrated. The food product may be formed into any traditional dry good food product, including but not limited to: chips, crackers, bars, cereal, pastas, jerky, etc. Although the examples described herein illustrate food products and methods of making food products formed into chips that are similar to traditional chips, the invention described herein may also be applied to form other food products. The resulting product may be a snack food, such as a chip, that is made without harm to an animal, and is high in protein and low in fat. The food product may provide a healthy, gluten-free, snack that is rich in protein, fiber and calcium, and may resemble the texture (e.g., crunchiness and/or friability) of a traditional chip without being fried or baked, eliminating the fat, and in particular saturated fat. Also described herein are methods of making a food product, such as a chip, from cultured cells (e.g., from animal muscle cells).

For example, described herein are edible, dehydrated food products that include cultured animal muscle cells, the cultured animal muscle cells combined with a plant-derived hydrogel, and a flavorant, wherein the cultured animal muscle cells and plant-derived hydrogel are formed as a dehydrated, sheet of material.

In general, the cultured cells are mixed in with the hydrogel, then allowed to set or gel and dehydrated. The mixture may be homogenous (e.g., relatively uniform) or non-uniform, as cells may clump. The cells may be non-adherent when mixed, or they may be clustered, for example, in small clusters or clumps. Thus, the mixture may include individual cells and/or clusters of cells distributed through the hydrogel that is then dehydrated. In the final food product, the cultured animal muscle cells and plant-derived hydrogel may be distributed throughout the sheet of material.

The flavorant may be coated onto the food product and/or within it (included in the mix with the cultured cells and the hydrogel). The flavorant may be added before, during or after dehydration.

For example, described herein are snack foods such as chips. An edible snack chip may include: cultured animal muscle cells, the cultured animal muscle cells combined with a plant-derived hydrogel; and a flavorant, wherein the cultured animal muscle cells and plant-derived hydrogel are formed as a dehydrated, sheet of material.

Any appropriate cultured animal muscle cells may be used. For example, cultured muscle cells (myocytes) may be derived from one or more of: beef, veal, pork, chicken, or fish. The cultured animal muscle cells may comprise one or more of: skeletal myocytes, smooth myocytes, and cardiac myocytes (or mixtures thereof). The cultured cells may be all myocytes or a majority of cultured myocytes. For example, the cellular component of the food product may have greater than 70 percent myocytes, greater than 80 percent myocytes, greater than 85 percent myocytes, greater than 90 percent myocytes, greater than 95 percent myocytes, greater than 98 percent myocytes, greater than 99 percent myocytes, etc.

Any appropriate hydrogel, and particularly a plant-derived polysaccharide, may be used. For example, the plant-derived polysaccharide may comprise pectin. The plant-derived polysaccharide (polysaccharide-based hydrogel) may be a low methyl (LM) esterified pectin. In general, a plant-derived hydrogel is a hydrogel that originated from a non-animal source. For example, the plant-derived hydrogel may have been extracted, purified or otherwise acquired from a plant source. A plant-derived hydrogel may also be a hydrogel that was identified as a natural product of a plant. Although the plant-derived hydrogel may have been identified from a plant source, the immediate source of a plant-derived hydrogel used in the food products described herein may be synthetic, for example, the plant-derived hydrogel may be synthesized or refined. Any of the plant-derived hydrogels described herein may also be replaced and/or mixed with a hydrogel of non-plant origin.

For example, an edible, dehydrated food product as described herein may comprise: cultured animal muscle cells, the cultured animal muscle cells combined with a plant-derived hydrogel; and (optionally) a flavorant; wherein the cultured animal muscle cells and plant-derived hydrogel are formed as a dehydrated sheet of material.

The cultured animal muscle cells and plant-derived hydrogel in the food product may be distributed throughout the sheet of material so that a section through the sheet of material has discrete muscle cells (cultured muscle cells) that may have a diameter of between about 2 μm to 50 μm (e.g., 2 μm to 40 μm, 2 μm to 35 μm, 5 μm to 50 μm, 5 μm to 40 μm, 5 μm to 30 μm, etc.) and may be distributed through the section. The cultured muscle cells may be identified morphologically, and by their expression of markers for muscle proteins, which may be seen ultrastructurally. For example, the cultured animal muscle cells and plant-derived hydrogel may be distributed throughout the sheet of material so that a section through the sheet of material has a pattern of dehydrated cultured muscle cells. The cultured muscle cells may be relatively intact, even after dehydration, and their origin as a cultured cells may be confirmed by one or more markers, for example by identifying the pattern of muscle proteins such as actin and myosin within the dehydrated cultured muscle cells. Thus, even in the dehydrated food product, a section through the food product will show a distinctive pattern resulting from the use of a mixture of cultured cells and plant-derived Any of the food products ("chips") described herein may also include edible microcarriers onto which the cultured animal muscle cells are grown.

As used herein the term dehydration or dehydrated in the context of the food product may refer to the removal of water from the food product, and in particular, the removal of a majority of water from the food product compared to a non-dehydrated form of the food product, so that the moisture content of the food product is less than, e.g., 70% (e.g., less than 65%, 75%, 80%, 85%, 90%, 95%, etc.).

In some variations, an edible, dehydrated food product configured as a snack chip includes: cultured animal muscle cells, the cultured animal muscle cells combined with a plant-derived hydrogel (e.g., polysaccharide); and a flavorant, wherein the cultured animal muscle cells and plant-derived hydrogel are arranged in sheet of material that is dehydrated with clusters of muscle proteins having a diameter of between 2 and 50 μm (e.g., 2-40 μm, 2-30 μm, 2-20 μm, 5-50 μm, 5-40 μm, 5-30 μm, etc.) distributed through the sheet.

The edible food products described herein may also be formed or shaped into an easily consumed form, and may resemble a traditional snack food (e.g., potato chip, stick, pretzel, etc.). For example, the thickness (or height) may be generally much smaller than a surface dimension such as the width and length (e.g., breadth, diameter, etc.). In some variations the edible body of the chip may have a diameter (e.g., surface/sheet diameter) that is more than ten times the thickness.

Also described herein are methods of forming edible food products. For example, described herein are methods of forming an edible food product, the method comprising: combining cultured muscle cells and plant-derived hydrogel to form a mixture; and dehydrating the mixture to form an edible sheet of material.

For example, the methods may be used to form edible snack foods. For example a method of forming a snack chip may include: combining cultured muscle cells and plant-derived hydrogel to form a mixture; and dehydrating the mixture to form a chip.

Any of these methods may also include adding a flavorant. The flavorant may be added during the mixing step, or may be mixed with any of the components (e.g., the cultured cells) before the mixing step. For example, the step of combining may include adding a flavorant to the mixture of muscle cells and plant-derived hydrogel. The flavorant may be added after mixing. For example, the flavorant may be added before dehydrating, during dehydration or after dehydration. Flavorant may be coated onto the food product.

In general, the step of combining may include combining one or more of cultured skeletal myocytes, smooth myocytes, and cardiac myocytes with the plant-derived hydrogel to form the mixture. As mentioned above, any appropriate cell type may be included.

In some variations additional components may also be mixed with the cells and hydrogel. For example, combining may include combining cultured muscle cells and plant-derived hydrogel, and a calcium chloride solution. Calcium chloride solution may both help in gelling the hydrogel, and may also add calcium to the food product, which may be beneficial. For example, combining may include combining cultured muscle cells and plant-derived hydrogel, flavorant and a calcium chloride solution.

Any of these methods may include the step of harvesting the cultured cells from a tissue culture chamber and washing the cells before combining with the plant-derived hydrogel. The cultured cells may be washed by repeatedly rinsing and spinning (e.g., centrifuging) to pellet and remove the wash solution. In some variations the cells may be taken up and/or rinsed in a solution including flavorant.

In any of the methods described herein, the cells, immediately prior to mixing, may be alive, dead or dying. Thus, the washing and/or mixing may reduce cell viability without affecting the quality of the final food product (e.g., taste, texture, nutritional content). However, in some variations, the cells may be kept alive until dehydration.

Any of the methods described herein may also include spreading the mixture onto a surface (e.g., mold) and allowing the plant-derived hydrogel to gel before dehydrating. The dehydration step may be performed on the same surface (e.g., mold) or they may be transferred to a different surface. Any appropriate mold (including coated molds) may be used. For example, the mold may be a flat surface (e.g., foil, polymer, paper, etc.). In some variations the mold may be adapted for use with the dehydrator. For example, the mold may be thermally conductive and/or vented or otherwise moisture-permiable.

In some variations, a method of forming a snack chip may include: combining cultured muscle cells, plant-derived hydrogel and flavorant to form a mixture; and dehydrating the mixture to form a brittle (e.g. friable) chip.

For example, a method of forming an edible food product may include: combining cultured muscle cells and plant-derived hydrogel to form a mixture; and dehydrating the mixture to form an edible sheet of material. The plant-derived hydrogel may be configured as an edible microcarrier (which may also include a polypeptide including a cell-attachment motif) onto which the cultured muscle cells are grown. Alternatively or additionally, in some variations, combining comprises combining cultured muscle cells grown on an edible microcarrier with the plant-derived hydrogel to form the mixture.

Combining may comprise combining cultured muscle cells and plant-derived hydrogel, and a calcium chloride solution and allowing the plant-derived hydrogel to set (e.g., gel). Any of these methods may include spreading (e.g., pouring, coating, spraying, etc.) the mixture onto a surface and allowing the plant-derived hydrogel to gel before dehydrating.

In addition, in any of these methods, dehydrating may include dehydrating the mixture to form a brittle (e.g., friable) chip.

For example, described herein are methods of forming an edible food product into a snack chip, the method comprising: combining cultured muscle cells and plant-derived hydrogel to form a mixture; spreading the mixture onto a surface in a layer; allowing the mixture to set; and dehydrating the mixture to form a chip.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIGS. 1A-1D illustrate components that may be combined to form the food products described herein. FIG. 1A shows a pellet of cultured muscle cells (approximately 500 million cells), shown in greater detail in FIG. 1B.

FIGS. 2A and 2B illustrate the formation of a food product configured as a chip.

FIGS. 3A1 and 3A2 show top and side views, respectively, of one configuration of a food product, configured as a chip, as described herein. FIGS. 3B1 and 3B2 show top and side views, respectively, of another configuration of a food product configured as a thin oval chip. FIGS. 3C1 and 3C2 show top and side views, respectively, of another configuration of a food product configured as a thin triangular chip.

FIG. 4 shows a transverse section through a dehydrated chip as described herein. The section has been stained using anti-alpha smooth muscle actin (SMA) antibodies. The SMA appears as darker, somewhat circular (cellular) shapes. The histology indicates a characteristic distribution of the muscle proteins (e.g., actin) within the cultured cells forming the chip, showing the pattern of dehydrated cultured muscle cells mixed with the animal-based hydrogel.

DETAILED DESCRIPTION

In general, described herein are food products formed from cultured cells, and particularly cultured muscle cells (myocytes) grown in vitro, without requiring further processing of the originating animal. The cultured cells may be grown using culture media that does not originate from animal sources (e.g. plant-derived, yeast-derived, single-cell derived, etc.). Further, the food products described herein may be formed by combining cultured cells with a hydrogel to form a mixture, allowing the mixture to gel, and dehydrating the resulting mixture to form the edible food product. The shape and/or flavor of the edible food product may be manipulated to determine the type of food product formed, including chips, crackers, bars, cereal, pastas, etc. One or more flavorants and/or fortifying agents may be added before, during, or after combining the cultured cells and hydrogel and dehydrating.

In general, any appropriate method of culturing cells may be used, including culturing on a surface, solution, bioreactor, etc. Cultured cells are typically muscle cells, such as non-human myocytes, though other cell types may be used. Cells may originate from any appropriate source. For example, suitable cells may be derived from mammals such as antelope, bear, beaver, bison, boar, camel, caribou, cattle, deer, elephant, elk, fox, giraffe, goat, hare, horse, ibex, kangaroo, lion, llama, moose, peccary, pig, rabbit, seal, sheep, squirrel, tiger, whale, yak, and zebra, or combinations thereof. In some embodiments, suitable cells are derived from birds such as chicken, duck, emu, goose, grouse, ostrich, pheasant, pigeon, quail, and turkey, or combinations thereof. In some embodiments, suitable cells are derived from reptiles such as turtle, snake, crocodile, and alligator, or combinations thereof. In some embodiments, suitable cells are derived from fish such as anchovy, bass, catfish, carp, cod, eel, flounder, fugu, grouper, haddock, halibut, herring, mackerel, mahi mahi, marlin, orange roughy, perch, pike, pollock, salmon, sardine, shark, snapper, sole, swordfish, tilapia, trout, tuna, and walleye, or combinations thereof. In some embodiments, suitable cells are derived from crustaceans such as crab, crayfish, lobster, prawn, and shrimp, or combinations thereof. In some embodiments, suitable cells are derived from mollusks such as abalone, clam, conch, mussel, oyster, scallop, and snail, or combinations thereof. In some embodiments, suitable cells are derived from cephalopods such as cuttlefish, octopus, and squid, or combinations thereof. In some embodiments, suitable cells are derived from insects such as ants, bees, beetles, butterflies, cockroaches, crickets, damselflies, dragonflies, earwigs, fleas, flies, grasshoppers, mantids, mayflies, moths, silverfish, termites, wasps, or combinations thereof. In some embodiments, suitable cells are derived from non-arthropod invertebrates (e.g., worms) such as flatworms, tapeworms, flukes, threadworms, roundworms, hookworms, segmented worms (e.g., earthworms, bristle worms, etc.), or combinations thereof. The cultured cells may be native or modified (e.g., transgenic).

In general, the cultured cells may be grown to a sufficient density, harvested, and washed before combining with other components of the food product mixture (including the hydrogel). Washing may remove media, and may be performed in water (including buffered solutions, such as PBS). Cultured cells may be repeatedly pelleted (e.g. by centrifugation) and rinsed to wash. In some variations cells may be cultured with a microcarrier, and in particular with an edible microcarrier. As will be described in greater detail below, the edible microcarrier may be an edible plant-derived polysaccharides which may also include a polypeptide including a cell-attachment motif. A plant-derived hydrogel may be used combined with cells grown on edible microcarriers as described herein for cells grown without edible microcarriers; alternatively in some variations no additional hydrogel is added and the edible microcarrier and cells alone may be used to form the chip.

As mentioned above, any appropriate hydrogel may be used. In general, the hydrogel must be edible (e.g., safe for human consumption). The hydrogel may include a polysaccharide that can be cross-linked, such as a pectin. For example, one class of polysaccharides that may be used are low methyl (LM) esterified pectins, an abundant plant derivate already used in food Any of the food products described herein may be referred to as dried food products or dehydrated food products.

Any of the food products described herein may include one or more flavorants. The term "flavorant" may mean both natural and artificial varieties. This is intended to include "natural flavorants" as defined, for example, by Title 21 of the U.S. Code of Federal Regulations, namely essential oils, oleoresins, essence or extractive, protein hydrolysates, distillates, or any product of roasting, heating or enzymolysis, which contains the flavoring constituents derived from a spice, fruit or fruit juice, vegetable or vegetable juice, edible yeast, herb, bark, bud, root, leaf or any other edible portions of a plant, meat, seafood, poultry, eggs, dairy products, or fermentation products thereof, whose primary function in food is flavoring rather than nutritional (21 CFR 101.22).

Flavorant(s) may also include "artificial flavorants", in particular, chemically synthesized compounds of natural flavorants that do not necessarily meet the specifications stated above. Artificial flavorants may include chemical compounds found in "natural flavorants."

In addition, "flavorant" may also be a general term to denote an agent that imparts taste, flavor aromatics, and feeling factors. Tastes are sensations that are processed through receptors on the tongue, and generally include salt, sweet, sour, and bitter. Flavor aromatics are those flavor volatiles emitted while biting, chewing, drinking and swallowing food, and are sensed by the olfactory receptors. Feeling factors, in the language of flavor, describe sensations perceived in the mouth, on the tongue, or in the nasal passages (or anywhere in the oral/nasal cavities). These sensations may be separate and distinct from tastes, salt, sweet, sour and bitter, and from the myriad of flavor aromatics perceived by the olfactory sense. Compounds which produce these sensations vary in volatility but many are susceptible to vapor phase transfer. Such feeling factors include the pungency of "smoke" flavors, astringency of fruits, cooling of mints, or the heat of peppers. More specifically, a flavorant may enhance or change the taste or the aroma of an item, or both the taste and aroma. This change may be to either enhance a desired taste or flavor, or mask an undesirable taste or aroma. It should be appreciated that flavorants, in most applications, are non-toxic and ingestible.

Flavorants may include flavor aromatics, although some components of flavorants do not possess olfactory stimulating properties. For example, flavoring condiments, some spices and seasonings, including artificial sweeteners, while lacking olfactory stimulating properties, are nevertheless useful flavorants in practicing the present invention. Certain spices or mixtures of spices for flavoring packaged snack foods, including such representative examples as potato chips, corn chips, barbecue chips, cheese crackers, as well as others, may be seasoned with homogeneous and heterogeneous combinations of solid or particulate spices and condiments, such as a spicy barbecue flavorant. They possess flavorant (taste) enhancing properties, and therefore, are useful flavorants along with other spices commonly applied to foodstuff as flavoring agents in manufacturing processes.

The following is not a comprehensive list, but is only representative of some common taste flavorants, plus some sensation producing flavorants. Examples of taste and sensation producing flavorants include, artificial sweeteners, glutamic acid salts, glycine salts, guanylic acid salts, inosinic acid salts, ribonucleotide salts, and organic acids, including acetic acid, citric acid, malic acid, tartaric acid, polyphenolics, and so on.

This list is only exemplary of common flavor aromatics. There are thousands of molecular compounds that may be combined or used independently to create a particular desired flavor. A few representative examples of common flavor aromatics include isoamyl acetate (banana), cinnamic aldehyde (cinnamon), ethyl propionate (fruity), limonene (orange), ethyl-(E,Z)-2,4-decadienoate (pear), allyl hexanoate (pineapple), ethyl maltol (sugar, cotton candy), methyl salicylate (wintergreen), and mixtures thereof.

Any of the food products described herein may also include one or more fortifying agents. A fortifying agent may be a vitamin, mineral, or the like, including any appropriate micronutrients. Examples may include, but are not limited to essential trace elements, vitamins, co-vitamins, essential fatty acids, essential amino acids, photonutrients, enzymes, etc.

As mentioned above, any of the food products and methods of forming them may be formed into any appropriate form factor. For example, the food products may be configured as a chip (e.g., the form factor of a potato chip, tortilla, or crisp). As used herein, a chip may refer generally to a thin piece of food (typically consumed by hand) that is often made crisp by being fried, baked, or dried and typically eaten as a snack, or as part of a meal.

EXAMPLE

In one example, a method of forming a dehydrated food product from cultured cells is adapted to produce chips with high animal protein content.

Edible chips are prepared by dehydrating a mixture of animal cells and hydrogel solution such as a plant-derived polysaccharide. One example of a polysaccharide that may be used is a low methyl esterified pectin, an abundant plant derivate already used in food. For the flavoring of the chips, specially-prepared vegetable broth and/or seasoning may be added. The mixture may be spread over a mold (e.g., a parchment paper mold) and dehydrated, e.g., in a food dehydrator, to enhance flavor and obtain crunchiness.

Figures 1A, 1B:
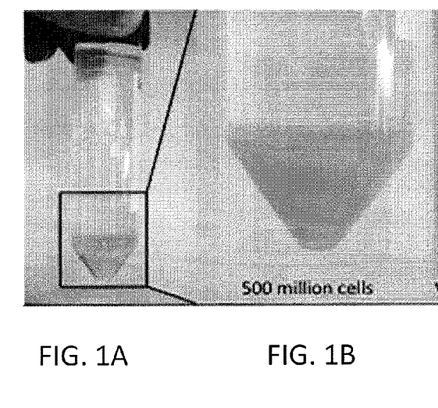
Figure 1C:
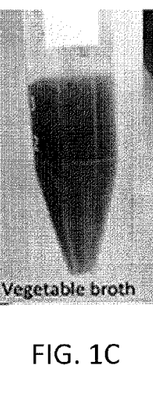
FIG. 1C shows a flavored vegetable broth (including flavorant) and FIG. 1D shows a 4% solution of pectin.
Figure 1D:
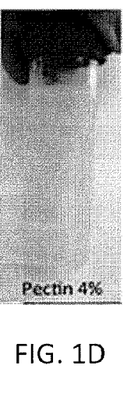
Figure 2A:
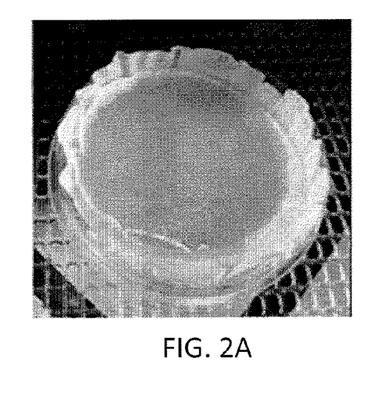
In FIG. 2A, the food product has been formed by combining the components illustrated in FIGS. 1A-1D along with a calcium chloride solution; this mixture is spread onto a mold, allowed to gel, then dehydrated.

FIGS. 1A-1D illustrate components that may be combined to form the food product. The ingredients entering in the composition of each of the chips in this example, include approximately 500 million cells (shown pelleted in FIGS. 1A and 1B), 800 microliters of a flavored broth (FIG. 1C) and 300 microliters of a 4% solution of plant-derived hydrogel (the polypeptide pectin in this example, shown in FIG. 1D). The addition of calcium may allow the pectin to gel after the mixture is spread on a surface such as a parchment paper mold, as shown in FIG. 2A. After the hydrogel is allowed to set, it may be dehydrated. Dehydration may be performed at 60° C. for 19 hours. The final product is a crispy, flavored chip (shown in FIG. 2B).

The food product (which may be referred to herein as a chip, edible snack chip, cultured cell snack chip, or the like) may be of any shape, including the shape of traditional "chips", including square, rectangular, triangular, oval, circular, or the like, and may be flat, bent or curved. Shapes may be formed by the dehydration process (e.g., on the mold). Once dehydrated, the shapes may be removed from the substrate (molding surface) and further processed. Further processing may include adding additional flavoring, including adding salt, sugar, etc. or edible coatings.

Figure 3A:
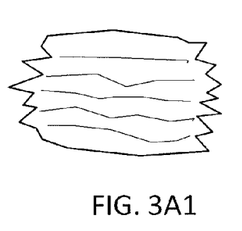
Figure 3A:
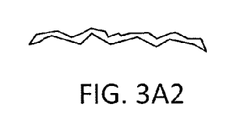
Figure 3B:
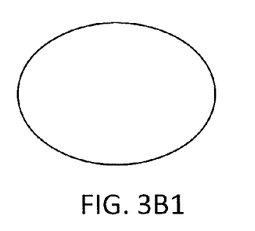
Figure 3B:
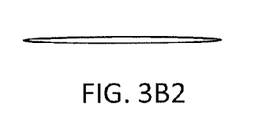
Figure 3C:
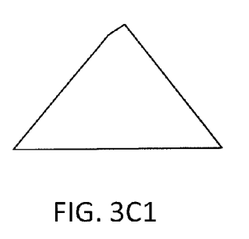
Figure 3C:
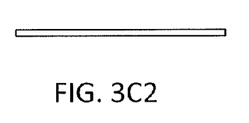

For example, FIGS. 3A1-3C2 illustrate examples of shapes of cultured cell snack chips that may be formed as described herein. Any appropriate size and shape may be formed as described herein in Example 1. In this example, the shapes are planar (though curved or bent); more complex shapes may also be formed. For example, FIG. 3A1 shows a cultured cell snack chip formed to have a ridged, somewhat irregular-appearing shape, similar to a traditional ridged potato chip. FIG. 3A2 shows a side view of this shape. Similarly, FIG. 3B1 shows a cultured cell snack chip having an oval shape, while FIG. 3B2 shows a side view of the chip. FIG. 3C1 shows a chip having a triangular shape and a relatively thin cross-section (FIG. 3C2). As mentioned, the cultured cell snack chips may be formed of any size (surface diameter, breadth, length, etc.) and thickness, including sizes and thicknesses that may be readily eaten by hand. For example the cultured cell snack chips may have a size (e.g., average or in some variations median surface diameter) of between about 1 cm and 15 cm (e.g., between about 2 cm and 10 cm, etc.) and a thickness of between about 0.1 mm and 10 mm (e.g., 0.5 mm and 5 mm, 0.5 mm and 4 mm, 0.5 mm and 3 mm, 0.5 mm and 2 mm, etc.).

Cultured muscle cells may be combined with the plant-derived hydrogel solution either immediately before dehydrating, or they may be cultured with a hydrogel. In some variations, as mentioned above, cells may be cultured on edible microcarriers that may be formed of a polysaccharide (which may also include a polypeptide including a cell-attachment motif) and/or other edible material. The cells may be muscle cells that are from an established cell line, including immortalized muscle cells, or they may be primary cultures, or they may be mixtures of these.

For example, in vitro cultured cells may be harvested to form the food product. For example, in the sample chip illustrated above, a culture of 500 million cells yield may be removed from CellStack culture chambers (i.e. seeded with 30 million bovine smooth muscle cells and cultured for 5 days). Cells may be washed by centrifuging to pellet the cells and rinsing with PBS. The PBS can then be removed. In this example, 800 microliters of a specially-prepared broth (spicy teriyaki sauce) may be added to the cells, and 300 microliters of a pectin solution (4% in distilled water) warmed up at 70° C. may also be added. The cell, broth and pectin mixture may be mixed (e.g., using an Eppendorf combitip), by vortexing, etc. Approximately 50 microliters of calcium chloride solution (0.5M in water) may then be added and the mixture again mixed (e.g., using an Eppendorf combitip to homogenize). Some air can be incorporated at this step.

Figure 2B:
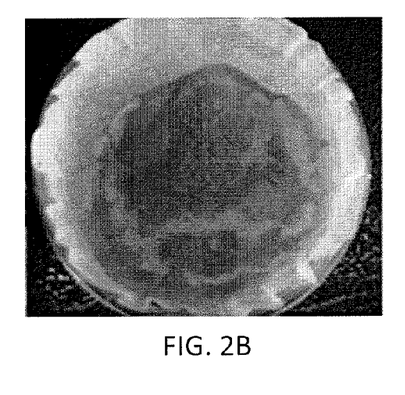
FIG. 2B illustrates the dehydrated food product resulting.

The mixture may then be distributed into a parchment paper mold that has been sprayed with 50 microliters of calcium chloride solution (0.5M in water), similar to that shown in FIG. 2A-2B. The pectin is allowed to gel for 5 minutes at room temperature. Thereafter, the mold and gel may be placed in a dehydrator at 60° C. for 19 hours to dehydrate the food product and form the chip. The chip may then be removed from the mold (parchment paper).

This method may be scaled up and/or automated to from multiple chips. As mentioned, the method may also be modified to form other food products.

The methods of forming the cultured cell snack chips described herein typically results in a chips that is structurally distinct from existing food products. This is apparent when examining the ultrastructural properties of the resulting chip. For example, a section through a cultured cell snack chip shows the dehydrated cultured muscle cells within a matrix of the dehydrated hydrogel. The identity of the cultured muscle cells may be confirmed by staining for identifying markers, including protein markers (e.g., actin, myosin, etc.). For example, in a section through the dried edible food product shown in FIG. 4, the ultrastructure shows residual cellular shapes (e.g., cultured muscle cells) distributed within the dehydrated hydrogel. In general, in a dehydrated chip the ultrastructure may show discrete and dehydrated cultured cells (or clusters of cells) that express specific markers such as animal protein markers. These cells are generally mixed with the plant-derived hydrogel. These chips may also be referred to as animal protein-containing chips. Visualization may show a distinct pattern of the cultured cells (or dehydrated remains of the cultured cells) within the plant-derived hydrogel. The cultured muscle cells may still be apparent (and reasonably intact) in the dehydrated product.

Figure 4:
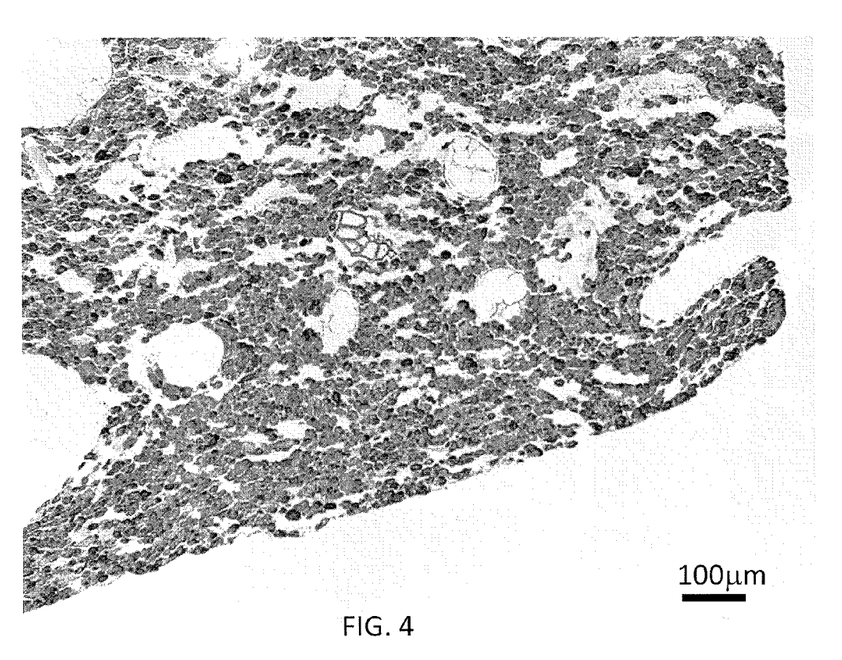

In FIG. 4, a section through one example of a dried chip formed as described herein shows smooth muscle actin (detected through reaction with alpha smooth muscle actin antibodies). The pattern of discrete cellular-shaped bodies in the dehydrated sample is characteristic of the cultured procedure used to form the chip, i.e., mixing cultured cells with hydrogel and dehydrating the mixture in a sheet.

Figure 5:
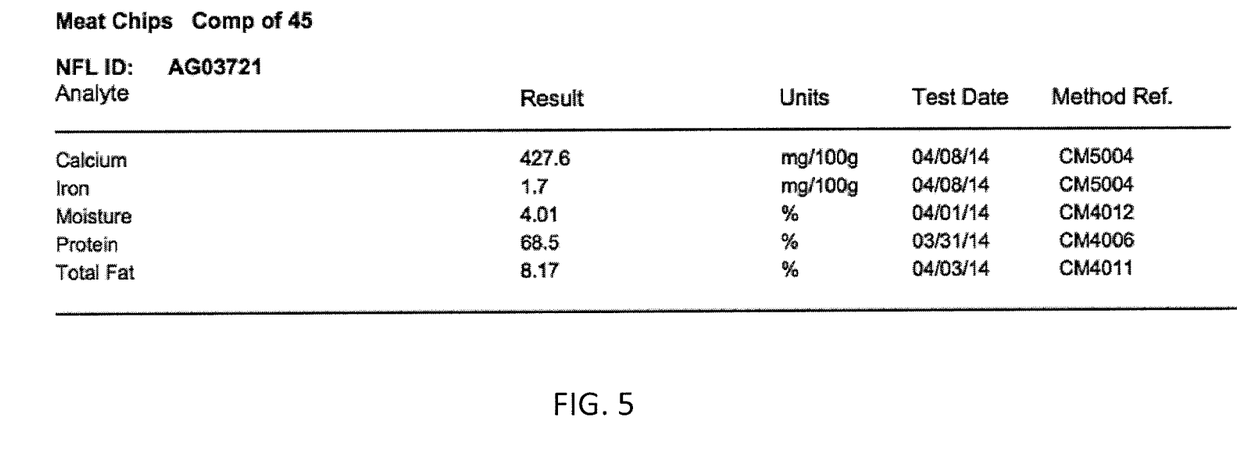
FIG. 5 is a table showing a compositional analysis of one example of a dried food product (chip) as described herein, showing the high percentage (e.g., greater than 50%) of protein. The composition may also indicate the presence of the animal-based hydrogel, and shows that in this example the dehydrated food product has a moisture content of less than 5% (e.g., 4.01% in this example) for the body of the dehydrated food product.

The composition of the edible food products formed as chip snacks may also be characteristic compared to other edible food products that are not formed of cultured cells mixed with hydrogel and dehydrated. For example, the table of FIG. 5 shows results of a nutritional analysis of a chip formed as described herein, and shows that it has a high protein content of (in this example, approximately 70%, though it may more generally be between about 40% and 90%, (e.g., between about 40% and 80%, between about 45% and 90%, between about 45% and 80% between about 50% and 90%, between about 50% and 80%, between about 60% and 90%, between about 60% and 80%, greater than 50%, greater than 55%, greater than 60%, greater than 65%, greater than 70%, greater than 75%, greater than 80%, etc.).

Edible Microcarriers

As mentioned above, any of the food products described herein may use cultured cells grown on edible microcarriers (including microbeads). Edible microcarrier may be formed of an animal-product-free material or materials, meaning the material or materials are derived from non-animal (including plant) sources. The edible microcarrier may typically be formed of a material that is edible (nutritious and/or safely digestible in large quantities) and a material having a cell-attachment domain or motif. In some variations the edible microcarrier may be formed, at least in part, by a cross-linked structure of polysaccharide and a polypeptide including a cell-attachment motif (such as RGD). As a specific example, the edible microcarrier may be formed by cross-linking a pectin (e.g., thiol-modified pectin, PTP) and an RGD-containing polypeptide such as the cardosins.

Any of the edible microcarriers described herein may also include additional (supplemental) material, including flavorants (additives for enhancing the flavor), additives for enhancing appearance and/or nutritive value of the edible microcarrier, and the resulting food product (e.g., chip) fabricated using the edible microcarriers. These additives (e.g., flavorants) may be used in place of, or in addition to, flavorants added prior to or after dehydrating.

For example, edible microcarriers may include edible microsponges and/or edible microbeads. These microcarriers may be porous (e.g., sponge-like) or smooth. The edible microcarriers for use in forming engineered meat may be formed into microbeads/microparticles for use in a bioreactor, and may be between about 3 mm and about 0.02 mm in diameter (e.g., between about 2 mm and about 0.05 mm, between about 1 mm and 0.1 mm, between about 1 mm and 0.3 mm, etc.). For example, the microbeads may be around 0.5 mm in diameter. The size may represent an average or median size, or a maximum/minimum size. The shape of the microcarriers may be regular (e.g., spherical, rounded, etc.) or irregular, for example spherical, cubic, or the like; any of these shapes may be porous.

Edible microcarriers may be made by any appropriate process, including molding, extrusion, injection, infusion, etc. of the material forming the edible microcarrier. Edible, highly porous microcarriers that can be used in cell culture techniques with the bioreactors and remain integral part of the final engineered comestible product (e.g., chip) may be formed from edible animal-free materials (including cultured animal cells that may be from long-term cultures or may be removed without killing the animal). Such edible microcarriers may be prepared by forming the components, e.g., polysaccharide and polypeptide, into a cross-linked hydrogel, lyophilization of cross-linked hydrogel, and shaping (e.g., cutting) the lyophilized gel into appropriate sizes.

One example of a method of forming an edible microcarrier includes forming the principle components of the microcarrier, the polysaccharide and polypeptide. For example, one class of polysaccharides that may be used are low methyl (LM) esterified pectins, an abundant plant derivate already used in food. For example the LM esterified pectin used may be derived to form a thiol-modified pectin (PTP) that is 100% edible and digestible. Thiol functions are found in garlic and onion. One class of polypeptides that may be used includes the cardosins. Cardosins are aspartic proteinases that may be extracted from *Cynara cardunculus* L., and that contain cell binding RGD motifs that promote cell attachment. For example, cardosins may be derivatized through their cysteines to introduce new thiol groups. Cardosins are already used by the food industry, specifically in cheese-making. In other variations, the cardosins could be substituted (or supplemented) by another polypeptide, including a synthetic peptide, with an RGD sequence that is edible.

In some variations, PTP and derivatized cardosins may be cross-linked through oxidative disulfide bond formation. In this example, PTP-cardosin hydrogel may be cross-linked under mild conditions using (the oxidized form of) glutathione disulfide (GSSG) obtained by bubbling air into a solution of high-grade glutathione (GSH, e.g., such as health-food store grade glutathione). Additional additive (e.g., flavorings, nutrients, colors, etc.) may be added as well.

The hydrogel may then be shaped or formed. For example, macrosponges (1-5 mm thick) may be formed by casting the hydrogel solution in molds and allow the cross-linking to continue in air overnight, then lyophilized and cut to desired dimension (larger sponges for tissue engineering applications, small fragments of ~0.5 mm for bioreactor applications).

For large scale production of microbeads, a coaxial airflow bead-making device may be used. For example, beads may be composed of the modified cross-linked pectin and cardosin hydrogel (e.g., PTP-cardosin hydrogel). In one variation, a method of forming microcarriers of PTP and cardosins may be performed by steps that may include: (1) creating pectin-thiopropionylamide (PTP) by derivatization of pectin with cystamine at two levels of modification (e.g., 10%, 25%) followed by reduction; (2) introduction of new thiol groups by derivatization of cardosin (e.g. cardosin A); (3) development of GSSG cross-linked hydrogel in slab format with PTP and thiolated cardosins (the pH, concentration, and the like may be optimized for forming the hydrogel; additives, e.g., coloring, nutrients, etc., may also be included), and the hydrogel may be lyophilized; (4) creating beads using a bead generator such as the Nisco coaxial airflow bead generator and lyophilize the GSSG hydrogel sphere to obtain the microcarriers.

In use, the microcarriers may be used to culture cells, for example smooth muscle cells, in large amounts for forming the edible materials (e.g., chips). As mentioned above, in general, other cells types may also be used on the microcarriers in addition to (or instead) of the muscle cells, including satellite cells, etc.

For example, microcarriers as described herein may be seeded with muscle cells (e.g., smooth muscle cells) and cultured. In particular, the cells and microcarriers may be cultured in a bioreactor. The resulting cultures may be grown to a desired level and used directly to form a chip, without the necessity to separate or otherwise remove the microcarriers. The chip may be formed as described above, in which (instead of combining just the cells and the hydrogel), microcarriers onto which cultured cells have grown are combined with a hydrogel and dehydrated. In some variations, the microcarriers with cells may be directly applied (e.g., poured, sprayed, etc.) onto the forming surface such as a mold prior, to dehydrating without adding hydrogel; for example, the microcarriers on the surface may be cultured to allow the cells and/or microcarriers to at least partially fuse. For example, the microcarriers with cells may be cultured on a surface for some amount of time (e.g., for 4 hours, 12 hours, 18 hours, 24 hours, 48 hours, 3 days, etc.) or may be immediately dehydrated.

In some variations the microcarriers with cells (which may be grown to density, including to confluence on the microcarriers) may be added together with additives including flavorant and with a solution of hydrogel (e.g., plant-derived polysaccharide), similar to what is shown and described in Example 1, above. Thereafter, the mixture may be dehydrated.

For example, the edible microcarriers with cultured cells may be formed into chips after incubation in the bioreactor for an appropriate time to allow cells to grow and multiply on the microcarriers (e.g., 12 hours, 24 hrs, 2 days, 3 days, 4 days, 5 days, 6 days, 7 days, 8 days, 9 days, 10 days, 11 days, 12 days, etc.), to form cellularized microcarriers. In general a cellularized microcarrier is a microcarrier (e.g., edible, animal-product-free) onto which cells (e.g., muscle cells) have adhered and grown. As mentioned, the cells on the microcarrier may be grown to confluence, though this is not required. Further, the cells may fuse on and/or in the surface of the microcarrier. The cellularized microcarriers may be at least partially fused.

In these examples, the body of the food product may also include microcarriers, which may be visualized (e.g., at magnification).

For example, in variations using edible microcarriers, a method of forming the chips described herein may include culturing a plurality of muscle cells on edible and animal-product-free microcarriers in suspension to form a plurality of cellularized microcarriers. The cellularized microcarrier may be mixed with a plant-derived hydrogel, and in some variations an additive such as a flavorant. The mixture of cellularized microcarriers and hydrogel (either with or without additional additives), may then be placed, poured, sprayed or otherwise applied onto a substrate (e.g., mold or other surface) appropriate for use in a dehydrator. The mixture may then be dehydrated as described above. Additional flavorants/additives (e.g., salt, etc.) may then be added, and the chips may be further processed and/or packaged.

Cells may generally be cultured with any of the edible microcarriers described herein in a suspension, including in a bioreactor. For example, cells may be seeded into the media along with the edible microcarriers and allowed to contact, adhere to, and grow on the appropriate edible microcarrier. For example, culturing may include culturing a plurality of muscle cells on edible and animal-product-free microcarriers comprising a hydrogel of thiol-modified pectin (PTP) and cardosin. In some variations, culturing comprises culturing a plurality of muscle cells on edible and animal-product-free microcarriers wherein the animal-product-free microcarriers comprise a flavoring, a flavor enhancer, a colorant, a color enhancer, and a nutritional enhancer.

In some variations a cellularized microcarrier is covered (e.g., greater than 50% covered, greater than 60% covered, greater than 70% covered, greater than 80% covered, greater than 90% covered, covered to confluency) with the cells. As described in U.S. Pat. No. 8,703,216, previously incorporated by reference in its entirety, the cells used may be one or more types, including in particular muscle cells. Microcarriers covered to the appropriate degree with cells (e.g., >50%, >60%, >70%, >80%, >90%, etc. covered) may be referred to as cellularized microcarriers.

Although the use of edible microcarriers as described herein is optional, it may provide some advantages over traditionally cultured cells. For example, cells used for the edible chips described herein, which may include, e.g., smooth muscle cells, satellite cells, fibroblasts, adipocyte progenitor cells, etc., are typically anchorage-dependent, and require a surface to attach to. Current cell culture methods may use flasks, tubes and/or plates (e.g., cellStacks or hyperflasks) to provide a surface onto which the cells may adhere and grow, which may result in a manual labor intensive process, and may require enzymes to detach the cells from the surface and large volume of medium to yield the cells. Most of the material is single use, thus generating waste; expansion of the cells is typically achieved by seeding more plates with larger number of layers as the culture progresses.

The microcarriers described herein may provide large surface area/volume for cell attachment, particularly if they are micro- or macro-porous. The initial step of cell expansion may include mixing the cells and the microcarriers in a small bioreactor. The cells attach and multiply on the microcarriers that are maintained in suspension. When the maximal growth is achieved, the microcarriers may be collected and can be used for seeding a bioreactor of larger volume, or may be used directly if sufficient amounts are grown. The cells don't have to be separated from the microcarriers, since the microcarriers described herein are edible, eliminating the use of enzymes and the risk to damage the cells. The process is time efficient and easy to scale up. Industrial bioreactors can achieved large volumes (e.g., greater than 1000 L) in less space than traditional cell culture incubators.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all subranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived therefrom, such that structural and logical substitutions and changes may be made without departing from the scope of this disclosure.

Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of forming an edible snack chip, the method comprising:
   culturing muscles cells;
   combining the cultured muscle cells and plant-derived polysaccharide-based hydrogel to form a mixture; and
   dehydrating the mixture to form an edible sheet of material;
   wherein the cultured muscle cells are combined with the plant-derived polysaccharide-based hydrogel and allowed to set immediately before dehydrating.

2. The method of claim 1, further comprising adding a flavorant.

3. The method of claim 1, wherein culturing comprises culturing the muscle cells with an edible microcarrier onto which the cultured muscle cells are grown.

4. The method of claim 1, wherein combining comprises adding a flavorant to the mixture of muscle cells and plant-derived polysaccharide-based hydrogel.

5. The method of claim 1, wherein combining comprises combining one or more of cultured skeletal myocytes, satellite cells, smooth myocytes, and cardiac myocytes with the plant-derived polysaccharide-based hydrogel to form the mixture.

6. The method of claim 1, wherein combining comprises combining cultured muscle cells and plant-derived polysaccharide-based hydrogel, and a calcium chloride solution and allowing the plant-derived polysaccharide-based hydrogel to gel.

7. The method of claim 1, wherein combining comprises combining cultured muscle cells and plant-derived polysaccharide-based hydrogel, flavorant and a calcium chloride solution.

8. The method of claim 1, further comprising harvesting the cultured cells from a tissue culture chamber and washing the cells before combining with the plant-derived polysaccharide-based hydrogel.

9. The method of claim 1, further comprising spreading the mixture onto a surface and allowing the mixture to gel before dehydrating.

10. The method of claim 1, wherein dehydrating comprises dehydrating the mixture to form a brittle chip.

11. The method of claim 1, further wherein dehydrating the mixture comprises dehydrating the mixture to form the edible snack chip having a thickness of between about 0.1 mm and 10 mm.

12. A method of forming an edible snack chip, the method comprising:
    combining cultured muscle cells and plant-derived polysaccharide-based hydrogel to form a mixture;
    spreading the mixture onto a surface;
    allowing the mixture to set; and
    dehydrating the mixture to form a chip, wherein the cultured muscle cells are combined with the plant-derived polysaccharide and allowed to set immediately before hydrating.

13. A method of forming an edible snack chip, the method comprising:
    culturing muscle cells;
    combining the cultured muscle cells and a plant-derived polysaccharide-based hydrogel to form a mixture;
    spreading the mixture onto a surface;
    allowing the mixture to set; and
    dehydrating the mixture to form a chip having a thickness of between about 0.1 mm and 10 mm,
    wherein the cultured muscle cells are combined with the plant-derived polysaccharide and allowed to set immediately before dehydrating.

* * * * *